March 13, 1956  H. A. SPAFFORD  2,737,713
GRAPEFRUIT CUTTER
Filed July 26, 1955
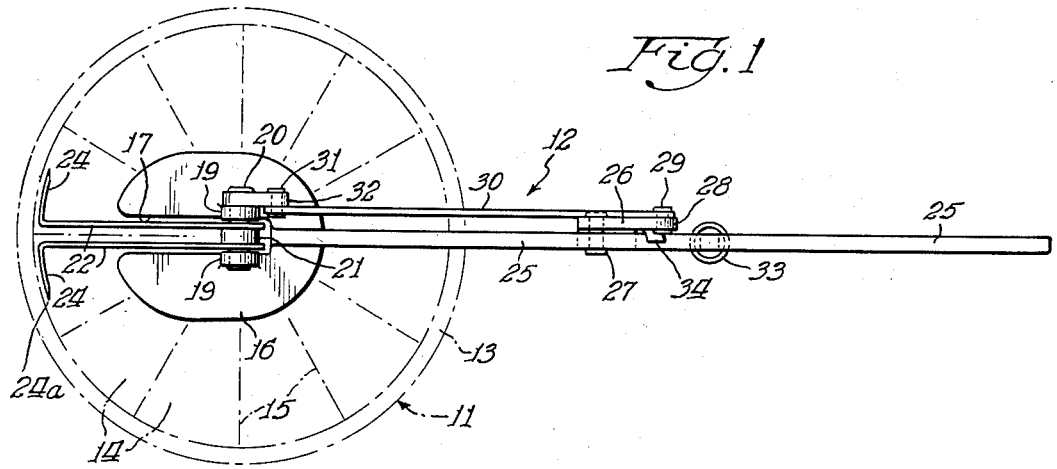
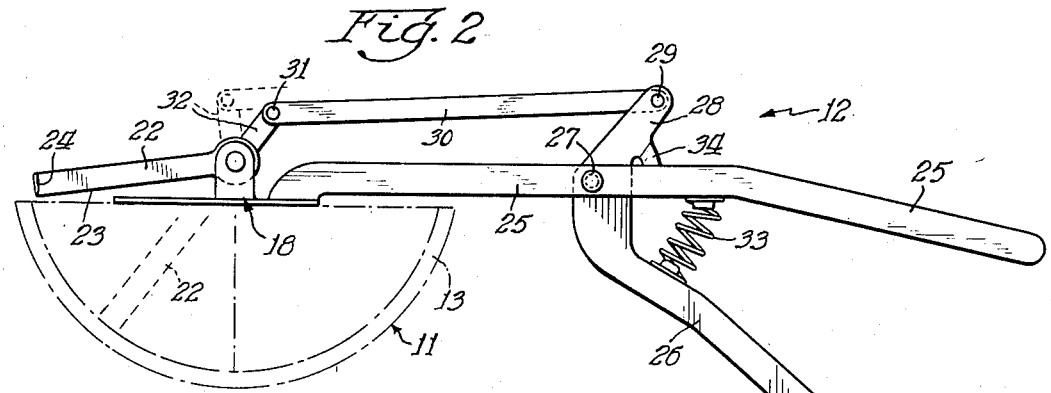
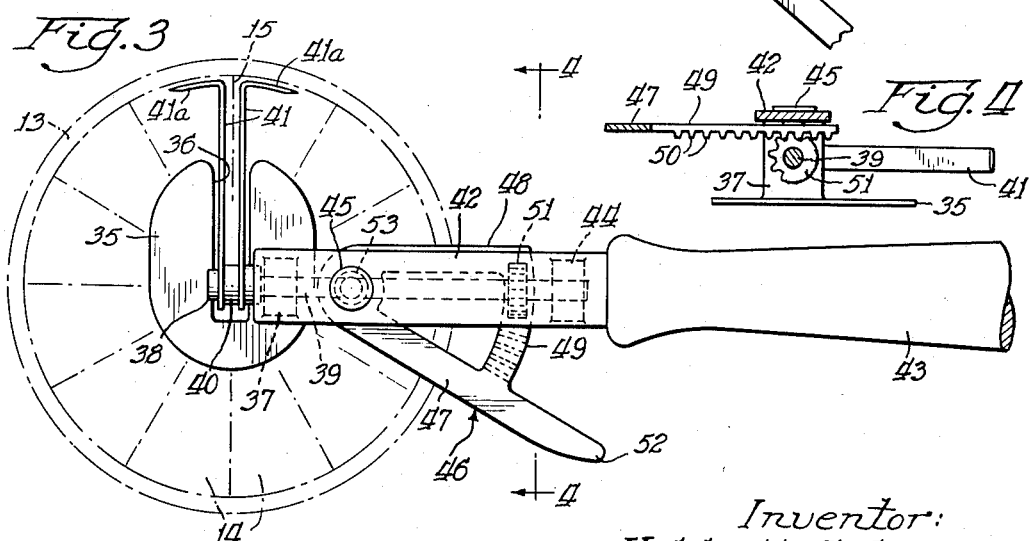
Inventor:
Hildreth A. Spafford
By: Jones, Tesch & Darbo
Attys

United States Patent Office 2,737,713
Patented Mar. 13, 1956

2,737,713

GRAPEFRUIT CUTTER

Hildreth A. Spafford, Springfield, Ill.

Application July 26, 1955, Serial No. 524,335

6 Claims. (Cl. 30—24)

This invention relates to a grapefruit cutter and more particularly for excising or releasing integral sections of the grapefruit in a uniform manner and with a minimum of contact of the hands of the user with the fruit.

This invention aims to provide a device which can be used in place of the ordinary grapefruit knife, such ordinary knife being characterized by the disadvantages of slowness and non-uniformity of result as well as requiring in its use adjacency of the user's hands which makes them likely to be sullied by the juice or torn particles of the fruit.

An important aspect of the present invention is the provision of a grapefruit cutter having a pair of spaced apart blades that will straddle the grapefruit membrane and a handle having a movable part for actuating the blades.

A further important object of the present invention is to provide a device of the nature herein described which is simple in construction and which can be manufactured in quantities at a cost rendering it available to a relatively large potential market.

These and other objects and advantages will be apparent from the following description, taken together with the accompanying drawings, showing illustrative embodiments of the invention, and in which drawing—

Figure 1 is a plan view of one form of the device embodying the present invention, associated with a half grapefruit shown in dotted lines;

Figure 2 is a side elevational view of the device of Fig. 1 showing in dotted lines an alternative or cutting position of the parts;

Figure 3 is a plan view of a modified form of the device embodying the present invention; and Figure 4 is a cross-section on the line 4—4 of Fig. 3.

Referring in detail to the illustrative construction shown in the drawings, and turning first to Figs. 1 and 2, the numeral 11 indicates a half grapefruit upon which the cutter 12 of the invention is intended to operate, the grapefruit having the outer tegument or rind 13 of hemispherical shape and the sector-like segments 14 of edible fruit which are separated by inedible, pithy membranes 15 radially disposed and radiating from a common central attachment, to attachment points at their outer ends to the rind 13.

The cutter 12 of the present invention, which is adapted for excising individual segments 14 by releasing the segments from attachment to the rind 13 and membranes 15, includes, as here shown, a shield or platen 16 having in this instance a radial slot 17, at the inner end of which is upstanding a bearing 18 including a pair of bearing members 19. In the bearing members 19 is journaled a rock shaft 20 to which, between the bearings 19, is affixed a hub 21 that prevents displacement of the shaft 20 from the bearings. A pair of knife blades 22, spaced apart in parallel vertical planes that pass through the slot 17, are carried by shaft 20 and fixed or coupled to the shaft, or to hub 21, for rotation with the shaft. The spacing of the blades by the hub 21 is just sufficient to accommodate between them one of the grapefruit membranes 15, that is to say, to straddle the latter. The knife blades 22 are sharpened on their lower edges 23, and, at their outer ends are turned angularly away from each other as at 24, preferably in a somewhat arcuate turn the arc of which corresponds roughly to that of the inner face of the grapefruit rind 13. These knife blade ends 24 are thus of somewhat spoonlike character, each extending for about half or a little more of the distance between one membrane 15 and the membrane next adjacent thereto at the periphery of the fruit. The sharpened edge 23 is desirably continued along the lower edges of the spoon-like ends 24, and the ends 24a are desirably sharpened.

Firmly secured to the platen 16 is a relatively fixed part 25 of a two-part scissors-like handle the other or relatively movable part 26 of which is pivoted to the part 25 intermediately of the latter at 27, and, on the opposite side of the handle part 25, terminates in a crank portion 28. Extending from the crank portion 28 and articulated therewith at 29 is a connecting link or pitman 30 that at its other end is articulated as at 31 with a short crank arm 32 that is rigid with the rock shaft 20. Between the handle parts 25 and 26 is carried a compression coil spring 33 that retracts or urges the handle parts away from each other, as shown in full lines at Fig. 2. Limitation of movement of the handle parts in such opening position may be provided by a lug 34 on the handle crank 28 arranged to abut the fixed handle part 25.

As indicated in dotted lines in Fig. 2, when the handle parts 25 and 26 are squeezed together, against the force of the compression spring 33, the pitman 30 is reciprocated in a manner to rock the shaft 20 in its bearings 19 and swing the pair of blades 22 downwardly into the grapefruit for about a quarter of a circle, in which operation the sharp lower edges 23 of the knife blades 22 sever the immediately adjacent segments 14 of the fruit from the membrane which is between the segments, and also freeing the segments, to at least about half of their outer ends, from the rind 13.

When this has been done, the movable handle part 26 is released, and, under the influence of the stored-up energy in the compression spring 33, the handle parts are moved apart or retracted to the position shown in full lines, at which time the pitman 30 is reciprocated in the opposite direction and the knife blades 22 pivoted in their bearings 19 upwardly to be returned to the position shown in full lines in Fig. 2. It will be understood that the blades move through the platen slot 17 during the action and reverse action just described, and that, for this purpose, the platen 16 will have been aligned by the user so that a membrane 15 is in a vertical plane passing through the slot and between the blades and with the blade spoon ends just inside the rind. The left hand of the user may be employed to hold the grapefruit in position and to turn it as required for the successive cutting operations, while the cutter is held in position and operated by the right hand.

When one operation as just described has been performed, the grapefruit may be rotated so that the cutter is brought to bear over the next adjoining membrane 15. Upon next operation of the cutter as described the remaining outer end of one of the grapefruit segments previously partially cut will be cut by the outer end of the adjacent knife, as well as the plane of attachment of the segment to the next adjacent membrane being cut by the knife itself. In this way, all of the segments of the half grapefruit will be cut and every segment may be readily removed for eating.

Turning now to Fig. 3, in the form there shown, the platen 35 is similar to the platen 16 having the radial slot 36 therein but has a bearing boss 37 upstanding laterally of the inner end of this slot. Overhanging the slot 36 is one end 38 of a rock shaft 39 that is journaled at its end just mentioned in bearing 37 and has pinned or otherwise fixed on its overhanging end 38 a blade hub 40. A pair of knife blades 41 having angularly formed outer ends 41a may be secured on opposite faces of hub 40 respectively, or the blades may be carried by shaft 39 with suitable provision for preventing relative rotation between the blades and shaft. The blades 41 are spaced apart by the hub just sufficient to straddle a membrane 15 of the grapefruit as are the blades 22 and are arranged to play in the slot 36 in a similar manner.

In Fig. 3, differentiating from the previous figures, the rock shaft 39 is extended laterally of the platen 35, parallel with and along but spaced from the shank 42 of the handle part 43, the handle part and its shank being fixed relatively to the platen 35 as for example by being made at one end rigid with the bearing 37. At its other end the shank 42 carries a depending bearing 44 for the rock shaft 39. The rock shaft is adapted for partial rotation in its bearings 37 and 44 under the influence of interposed actuating means next described.

Pivoted on the shank 42 as at 45 is a lever 46 having angularly related branches 47 and 48, between the outer ends of which extend a miter gear sector or arcuate rack 49 having gear teeth 50 which mesh with a pinion 51 pinned to the rock shaft 39 in the path of the gear rack. Preferably, pinion 51 comprises a sector, only, of the full pinion, a portion of the blank being uncut to provide stops limiting rotation of shaft 39 to about a quarter circle. The branch 47 of the lever 46 is continued as at 52 toward the handle 43 to provide a thumb piece which may be pressed upon as the user's hand grasps the handle 43. Upon pressure on the thumb piece 52 toward the handle rock shaft 39 is rotated. Since the actuating lever 46 is between the handle shank 42 and the pinion 51 the rock shaft 39 is rotated in a direction to press the knives 41 downwardly into the grapefruit, similarly to the action of the knives 22 of the previous figures. When the thumb piece is released, a torsion spring 53, connected between the shank 42 and the lever 46 on the pivot 45 of the lever, retracts the thumb piece, and thus the knives, to the position shown in Fig. 3. Thereupon, with the left hand the user may rotate the grapefruit under the platen 35 to relocate it with the blades 41 straddling the next adjacent membrane 15 of the fruit.

In each form of the device, a grapefruit cutter is provided which includes a pair of spaced apart knife blades having outer angular ends, and an operating handle, with interposed actuating connections for swinging the blades downwardly into the fruit, so that segments of the fruit may be successively released and when all have been so cut free they may be easily removed with a spoon. In each case, the knives move integrally and cut simultaneously, cutting along the opposite faces of the straddled radial membrane and down the inner face of the peripheral rind. After each cutting operation, the knives are returned through the cut to the normal position ready for making the next cut. Preferably, spring means are provided for return of the knives after completion of a cut, but it will be understood that this may also be done manually. If the spring is omitted, for example, loop handles, as generally employed in scissors, may be used. Many other modifications of the structure shown by way of example of the device are possible.

What is here claimed is:

1. A grapefruit cutter comprising a platen member having a radial slot therein, bearing means carried by said platen member at the inner end of said slot, a rock shaft rotatable in said bearing, a pair of knife blades rigidly mounted on said shaft and spaced apart in parallel vertical planes passing through said slot, the outer end of each blade being bent angularly away from the other blade at a point beyond said platen, a two-part handle, first said part being rigidly connected with said platen and a second part being movable with respect to the first part, and motion transmitting means between said blade and said handle second part for partially rotating the shaft upon movement of the handle parts towards each other to pivotally move the blades simultaneously in said planes, and spring means for retracting the handle parts and the knife blades.

2. The structure of claim 1 wherein said motion transmitting mechanism includes a crank arm on said knife shaft, a crank arm on said second handle part and a connecting link between said crank arms, and a compression coil spring is interposed between the handle parts for separation of the handle parts.

3. The structure of claim 1 wherein said motion transmitting mechanism includes a thumb lever pivoted on said first handle part and providing said movable handle part, a rack sector rigid with said thumb lever, an extension of the shaft along the first handle part, a pinion rigid with the shaft extension meshing with said rack, and a torsion spring is interposed between the thumb lever and the first handle part.

4. A grapefruit cutter comprising a platen member having a radial slot therein, bearing means mounted on the platen member, a pair of knife blades vertically aligned with said slot and movable therethrough on said bearing means in parallel vertical planes, each blade having an outer extremity bent angularly outwardly from the outer portions of said blades, a handle connected with said platen, and interposed actuating linkage connections to the blade carried in part by the handle for moving the blades simultaneously.

5. A grapefruit cutter comprising a platen member having a radial slot therein, bearing means mounted on the platen member, a pair of knife blades vertically aligned with said slot and movable therethrough on said bearing means in parallel vertical planes, each blade having an outer extremity bent angularly outwardly from the outer portions of said blades, a handle connected with said platen, a support rigidly connected to said platen, and actuating mechanism carried by said support for simultaneously moving said knife blades in cutting and retracting operations.

6. A grapefruit cutter, comprising, a platen member for placing on top of a half-grapefruit, a bearing element mounted on said platen, a shaft rotatable in said bearing element, a pair of knife blades fixed on said shaft and adapted to straddle a membrane of the grapefruit, a handle, and means connecting the handle with the shaft for rotating the shaft and thereby swinging the blades simultaneously downwardly on each side of said membrane, the blades having sharpened ends turned away from each other for cutting the grapefruit segments adjacent the rind.

References Cited in the file of this patent

UNITED STATES PATENTS

| | | |
|---|---|---|
| 1,376,888 | Kass | May 3, 1921 |
| 2,503,475 | Foerster | Apr. 11, 1950 |